US00H002236H

(19) United States
(12) Statutory Invention Registration
Nechitailo et al.

(10) Reg. No.: US H2236 H
(43) Published: Apr. 6, 2010

(54) METHOD FOR DEFEATING A WARHEAD THAT CARRIES SUBMUNITIONS

(75) Inventors: Nicholas V. Nechitailo, King George, VA (US); John F. Busic, King George, VA (US)

(73) Assignee: The United States of America as represented by the Secretary of the Navy, Washington, DC (US)

(21) Appl. No.: 11/973,995

(22) Filed: Sep. 27, 2007

Related U.S. Application Data

(60) Provisional application No. 60/854,460, filed on Sep. 29, 2006.

(51) Int. Cl.
*F42B 12/22* (2006.01)

(52) U.S. Cl. ..... 102/494; 102/489; 102/491; 102/492; 102/475; 102/480

(58) Field of Classification Search ..... 102/489, 102/491, 492, 475, 480, 494
See application file for complete search history.

(56) References Cited

U.S. PATENT DOCUMENTS

| | | | | |
|---|---|---|---|---|
| 5,341,743 | A | 8/1994 | Redaud | 102/384 |
| 6,494,140 | B1 | 12/2002 | Webster | 102/374 |
| 2003/0029347 | A1 * | 2/2003 | Lloyd | 102/489 |
| 2003/0172832 | A1 * | 9/2003 | O'Dwyer | 102/475 |

OTHER PUBLICATIONS

H. M. Westergaard, "Bearing Pressures and Cracks", *Journal of Applied Mechanics,* v. 7, ©1939, pp. A49–A53.

* cited by examiner

*Primary Examiner*—Michelle Clement
(74) *Attorney, Agent, or Firm*—Gerhard W. Thielman

(57) ABSTRACT

A method is provided for destroying a target that includes dispersing submunition fragments in an array that is directed to intercept the target, and engaging said fragments to collide against an outer shell of the target, wherein said array distributes said fragments as having a ratio between a characteristic length of said fragments and a separation distance of at most 2.5 and a collision velocity of between 1.8 km/s 2.0 km/s. The ratio is preferably at most 1.9. The characteristic length corresponds to a spherical radius of the fragment. Each fragment has a mass between 150 grains and 300 grains. The array is preferably aligned to intercept the target at an angle offset by between 15° and 45° from perpendicular to a longitudinal axis of the target. Each fragment has a preferable shape of a prism, a trapezoid or a pyramid.

12 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

| TEST # | NUMBER AND SIZE OF FRAGMENTS | OBLIQUITY, DEG | PERFORATED HOLES IN OUTER SKIN AND INTERNAL COMPONENTS? | BROKEN RIVETS? | TORN OUTER SKIN? | LEVEL OF STRUCTURAL DAMAGE |
|---|---|---|---|---|---|---|
| 1 | 1 x 300 | 15 | YES | YES | | LOW |
| 2 | 2 x 300 | 15 | YES | | NO | MODERATE TO SEVERE |
| 11 | 3 x 300 | 15 | YES | | YES | SEVERE |
| 3 | 4 x 300 | 15 | YES | | YES | CATASTROPHIC |
| 4 | 4 x 150 | 15 | YES | YES | NO | SEVERE |
| 13 | 4 x 150 | 15 | YES | | NO | MODERATE TO OUTER SKIN. KILLED INTERNAL COMPONENTS. |
| 12 | 6 x 150 | 15 | YES | | NO | MODERATE TO SEVERE. KILLED INTERNAL COMPONENTS |
| 5 | 8 x 150 | 15 | YES | | YES | CATASTROPHIC |
| 6 | 1 x 300 | 45 | YES | | | SEVERE |
| 7 | 2 x 300 | 45 | YES | | | |
| 8 | 4 x 300 | 45 | YES | | YES | CATASTROPHIC. TORN INTERNAL COMPONENT SKIN |
| 10 | 4 x 150 | 45 | YES | YES | NO | SEVERE. TORN INTERNAL COMPONENT SKIN. EXIT HOLE. |
| 9 | 8 x 150 | 45 | YES | YES | NO | SEVERE. TORN INTERNAL COMPONENT SKIN |

FIG. 12

METHOD FOR DEFEATING A WARHEAD THAT CARRIES SUBMUNITIONS

CROSS REFERENCE TO RELATED APPLICATION

Pursuant to 35 U.S.C. §119, the benefit of priority from provisional application 60/854,460, with a filing date of Sep. 29, 2006, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for government purposes without the payment of any royalties thereon or therefor.

BACKGROUND

The invention relates generally to damage infliction on target structures. In particular, the invention relates to enhanced damage to submunitions and rupture of warhead targets carrying submunitions.

The United States Missile Defense Agency (MDA) is developing defense systems to intercept threat re-entry vehicles in their terminal stage of flight. The vehicle payloads may contain a large number of submunitions to be spread over a targeted territory. A typical submunition is a small breakable metal container filled with a chemical or biological agent. Several approaches are considered by the MDA to defeat the reentry vehicles.

SUMMARY

Conventional methods yield disadvantages addressed by various exemplary embodiments of the present invention. Such disadvantages include external impact causing breakage of a number of submunitions. In particular, various embodiments provide for damaging the warhead's outer shell to rupture so as to compromise its aerodynamic characteristics and thereby cause its submunitions to be scattered prior to reaching the target.

Various exemplary embodiments provide a method for destroying a target that includes dispersing pressure-releasing fragments in an array that is directed to intercept the target, and engaging the fragments to collide against an outer shell of the target, wherein the array distributes the fragments as having a ratio between a characteristic length of the fragments and a separation distance of at most 2.5 and a collision velocity of between 1.8 km/s and 2.0 km/s.

In various other embodiments, the ratio is preferably at most 1.9. The characteristic length corresponds to an equivalent spherical radius of the fragment. Each fragment has a mass between 150 grains and 300 grains. The array is preferably aligned to intercept the target at an angle offset by between 15° and 45° from perpendicular to a longitudinal axis of the target. Each fragment has a preferable shape of a prism, a trapezoid or a pyramid.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 12 is a table of tests conducted.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice invention. Other embodiments may be utilized, and logical, mechanical, and other changes may be without departing from the spirit or scope of the present invention. The following detailed description is, therefore, not to be taken in a limiting sense, and the scope of the present invention is defined only by the appended claims.

Conventional methods of defeating submunition-filled payloads are based on kinetic kill vehicles (KKV). A solid object, namely the KKV, strikes the target at optimal angle and location to inflict damage to a maximum number of submunitions. This method has several limitations including lack of operational flexibility in view of sparse intelligence information regarding foreign submunitions development. Some submunitions are made of thin aluminum shells and require only modest collision to destroy, while others are robust thick-walled steel containers.

Another difficulty involves definining optimal angles and locations for the KKV impact. Conventionally, a large KKV is desired to ensure target destruction, but the KKV's inertia at a typical speed (near 2 km/s) adversely influences maneuverability.

Various exemplary embodiments can be used as enhancement to the existing KKV-based defeat systems. Also these can be used against other thin-walled structures and vehicles including boats and ships where perforation of a large hole is desirable. As described herein, various exemplary embodiments incorporate arrays of pressure-releasing penetrators hitting the target almost simultaneously. The penetrators may be spaced to form a row or another pattern maximizing the extent of the impact region. Several damage mechanisms can be thereby produced.

Advantages from these embodiments include: (1) Perforation of the vehicle skin and submunitions due to direct hit by the penetrators. (2) Submunition damage due to inter-impacts. (3) Rupture and opening of aeroshell skin along the perforated holes due to internal overpressure. (4) Submunition expulsion through the skin openings under overpressure. (5) Loss of the target aerodynamic properties due to the structural damage.

Figure 1A:
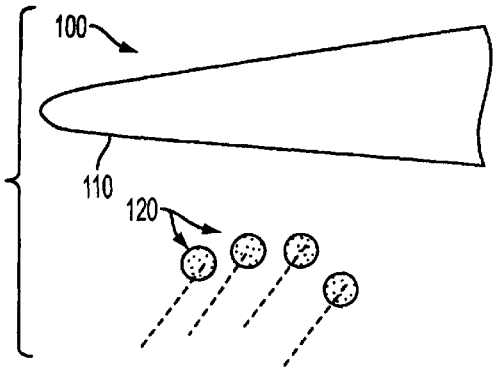
FIGS. 1A and 1B are elevation views of a target platform before and after being struck by submunitions.
Figure 1B:
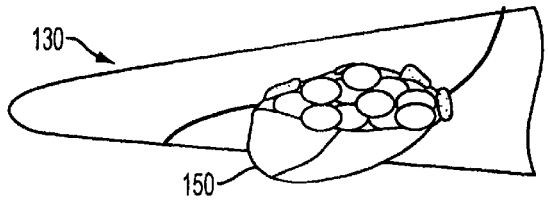

Various exemplary embodiments provide for improved disabling of a target by multiple projectiles. In particular, these embodiments enable stress concentrations from the projectiles to produce structural failure of the target. FIG. 1A shows an elevation view 100 of a target 110 being approached by several submunitions 120. FIG. 1B shows an elevation view 130 of the target 140 after colliding with the submunitions 120, with portions of its outer shell (or sheath) 150 being opened, thereby causing premature release of its delivery contents as well as disruption of its aerodynamic characteristics. Arrays of pressure-releasing fragments can be used to induce cracking and petal unfurling of the target's aeroshell skin. Such submunitions 120 can be contained and dispersed by a launched projectile directed to intercept the target 110.

Figure 2:
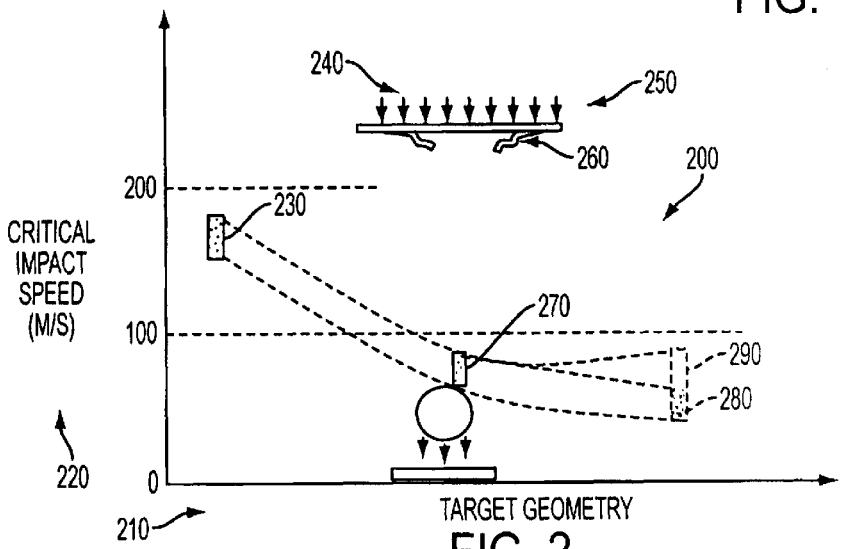
FIG. 2 is a graph of critical impact speed versus target geometry.

FIG. 2 shows a graph 200 of critical impact speed as a function of target geometry, which represents the abscissa 210, while critical impact speed $V_{cr}$ (in m/s) represents the ordinate 220. The analytical model for 7075 aluminum provides an example 230 of $V_{cr}$=169 m/s for a uniform pulse pressure load 240 is imposed on an initially flat plate 250 to cause rupture 260 for this analysis. A smooth sphere 270 as the projectile shape has a predicted critical speed of about 75 m/s. Experiments show that critical speeds from submunition projectiles having single and multiple fins range between 40 to 60 m/s and 60 to 90 m/s, respectively represented by lower 260 and upper 270 dash regions.

Figure 3:
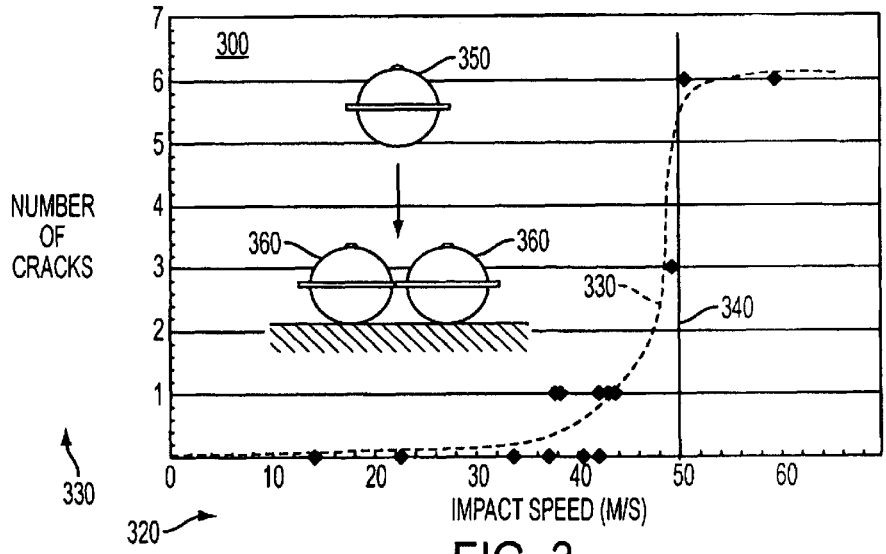
FIG. 3 is a graph of number of cracks versus impact speed.

Artisans of ordinary skill will recognize that collision damage to a target depends on impact speed based on its relationship to momentum. FIG. 3 shows a graph 300 that provides experimental data for number of cracks in a target shell as a function of impact speed (in m/s). The abscissa 310 represents the impact speed, whereas the ordinate 320 represents the cracks number. A dash line 330 represents a curve-fit for the measured data. As can be observed, below about 45 m/s, at most only one crack develops, whereas a plateau of six cracks appear above 50 m/s, which represents a threshold 340 for the conditions tested.

The experimental data were obtained for spheroid target and projectile geometries, all approximately one-inch in diameter. The projectile spheroid 350 is directed towards the target spheroids 360 disposed on a rigid flat surface.

An empirical formula for critical velocity $V_{cr}$ is derived from characteristics of materials and geometry: $V_{cr} \sim C_1C_2C_3[\epsilon_{cr}\ \sigma_0/\ \rho]^{1/2}$, where $\epsilon_{cr}$ represents strain at failure, $\sigma_0$ represents yield or ultimate tensile strength, $\rho$ represents materials mass density, $C_1$ is a material constraints parameter, $C_2$ represents shape, fill and stress concentration elements, and $C_3$ relates impact speed and number of submunitions.

Example values for aluminum structures is $\epsilon_{cr}$=0.11, $\sigma_0$=505 MPa, $\rho$=291 kg/m$^3$, $C_1$=1.2 for aluminum, $C_2$=0.3 for an example sub munition, $C_3$ can range from 0.8 to 1.1 for a single sub munition (between 41 m/s and 55 m/s) and from 1.4 to 1.9 two-to-four submunitions (between 68 m/s and 95 m/s).

Although a variety of geometric shapes can be employed for fragments, greater damage to a target's shell typically results from shapes with sharp corners, at which stress concentrations can be initiated upon contact with the target. Such preferable shapes include the prism, trapezoid and pyramid.

Figure 4:
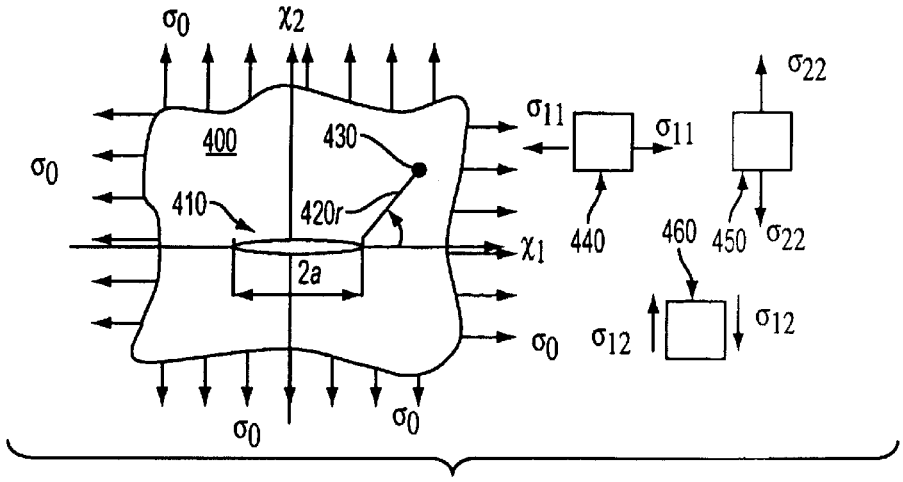
FIG. 4 is a diagram of stress concentration for a single crack.

To propagate a crack within the target shell, an analysis provides information on stress concentration for a plate 400 in an infinite plane shown in FIG. 4 with uniform tensile stress $\sigma_0$ applied. An elliptical opening 410 is disposed amid the horizontal and vertical axes $x_1$ and $x_2$. A line 420 representing a potential crack extends from one side of the opening, extending to an end point 430 at which may be calculated. The opening 410 has a longitudinal length of 2 *a* along the $x_1$ axis. The line 420 for the potential crack has a length r.

The tensile stresses can be calculated in the horizontal $\sigma_{11}$ and vertical $\sigma_{22}$ directions with the Westergaard's stress function $Z_i$ for each mode i=1, 2 representing the axes. Shear stress $\sigma_{12}$ and the Mode I stress intensity factor $K_I$ can also be calculated. Square diagrams 440, 450 and 460 illustrate the respective horizontal, vertical and shear stress orientations. These functional relations can be expressed as:

$$\sigma_{11}=\mathrm{Re}\ Z_i(\xi)-x_2\ \mathrm{Im}\ Z'_i(\xi)=\sigma_0(a/2r)^{1/2}\cos(\theta/2)\,[1-\sin(\theta/2)\sin(3\theta/2)]$$

$$\sigma_{22}=\mathrm{Re}\ Z_i(\xi)+x_2\ \mathrm{Im}\ Z'_i(\xi)=\sigma_0\,(a/2r)^{1/2}\cos(\theta/2)\,[1+\sin(\theta/2)\sin(3\theta/2)]$$

$$\sigma_{12}=-x_2\ \mathrm{Re}\ Z'_i(\xi)=\sigma_0\,(a/2r)^{1/2}\sin(\theta/2)\cos(\theta/2)\cos(3\theta/2)$$

$$K_I=(\pi a)^{1/2}\ \mathrm{Iim}_{(\xi\to 0)}\,(\xi)^{1/2}\,Z_i(\xi)=\sigma_0\,(\pi a)^{1/2},$$

where a represents opening longitudinal length, r represents crack length, $\xi$ is a complex variable representing length of the line 420 from the closet end of the opening 410 to the end point 430 on the plate 400, $\theta$ is the angle from the $x_1$ axis at the edge of the opening 410 to the point on the plate 400, and $\sigma_0$ represents the uniform static load. The complex stress function $Z_i$ depends on variable $\xi$ as an independent parameter, while $Z'_I$ represents the first derivative of $Z_i$ with respect to $\xi$. The real and imaginary portions are denoted by Re and Im functions. Stress intensity factor (for Mode I) $K_I$ is proportional to the stress and the square root of crack length.

Figure 5:
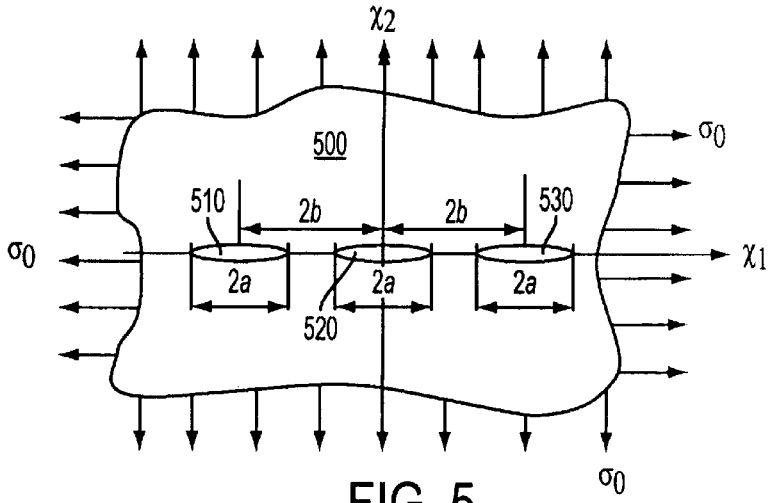
FIG. 5 is a diagram of stress concentration for multiple cracks.

FIG. 5 shows a similar plate 500 in an infinite plane with uniform tensile stress $\sigma_0$ applied, but with a set of three openings 510, 520 and 530. Each opening has a longitudinal length along the horizontal $x_1$ axis 2*a*. The distance between the centers of adjacent openings is 2*b*. The previous analysis is extended to provide:

$$K^*_I=K_I\{(2b/\pi a)\tan(\pi a/2b)\}^{1/2}=\sigma_0\,(\pi a)^{1/2}\,\{(2b/\pi a)\tan(\pi a/2b)\}^{1/2},$$

where $K^*_I$ represents the Mode I stress intensity factor for multiple cracks. The multiple-opening geometry term $\{(2b/\pi a)\tan(\pi a/2b)\}^{1/2}$ represents an additional multiplication factor due to multiple cracks.

Stress rapidly increases with decreased distance between cracks. Desired distance b between openings is less than the opening length a multiplied by a factor of 1.5, or $b \leqq 1.5a$. This analytical solution suggests that the stress concentration can be enhanced by increasing the crack length and reducing the distance between the cracks.

Figure 6:
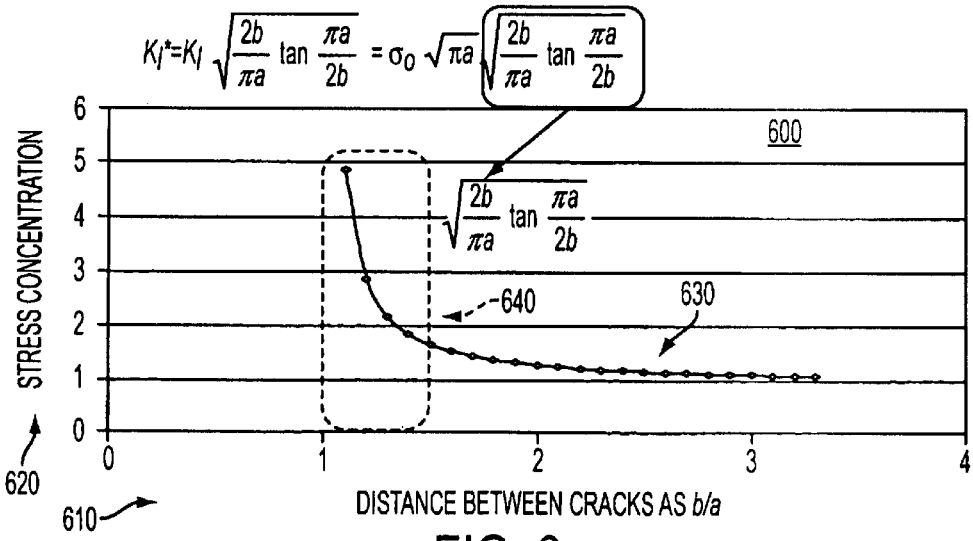
FIG. 6 is a graph of stress concentration versus distance between cracks.

FIG. 6 provides a graph 600 illustrating stress concentration in relation to the normalized distance between cracks. The abscissa 610 represents the distance ratio b/a between cracks, while the ordinate 620 represents the stress concentration factor. A linear curve 630 shows the relationship of stress concentration for b/a>1. As the distance ratio decreases to approach unity, the stress concentration increases asymptotically, as emphasized by the dash boundary 640 exemplary of the multiple-opening geometry term.

Figure 7:
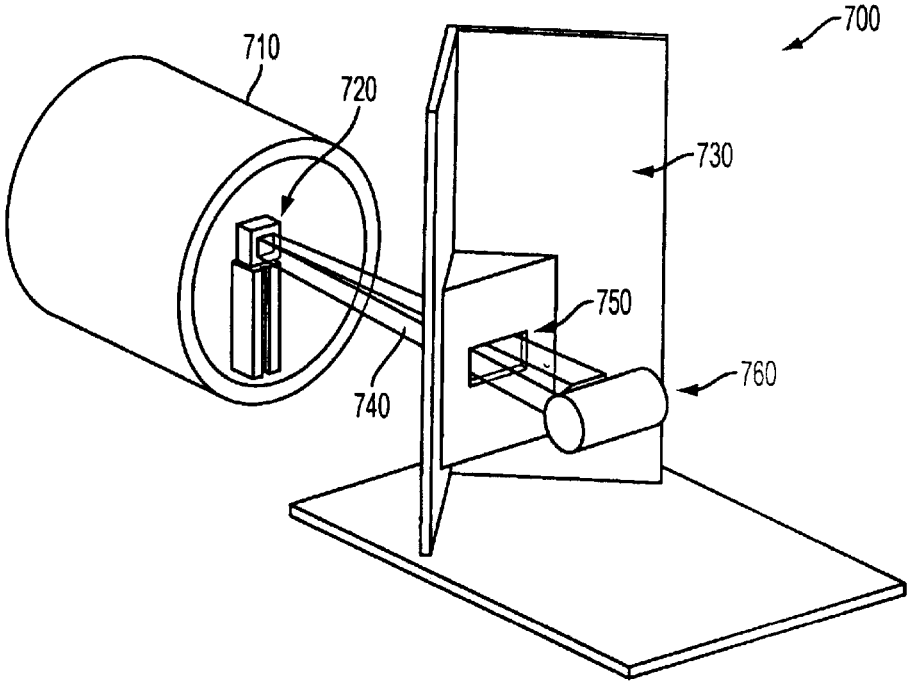
FIG. 7 is an isometric view of a test apparatus for launching projectiles at a target.

FIG. 7 shows an isometric diagram of a test apparatus 700. The apparatus includes a projection chamber 710 mounting a plastic explosive 720. A deflector plate platform 730 is disposed beyond the chamber 710. During the test, the explosive 720 simultaneously produces several aluminum-Teflon fragments 740 dispersing at high velocity. Several of these fragments 740 pass through a stripper window 750 of the platform 730 opposite which is a cylindrical target 760. Velocities, positions and unit integrity of projectiles can be measured using flash X-rays. In addition, a Phantom digital video camera can record the impact event from a side view at ~7000 frames per second. Maximum distance between the first and last projectiles hitting the target was about 30 cm.

Figure 8A:
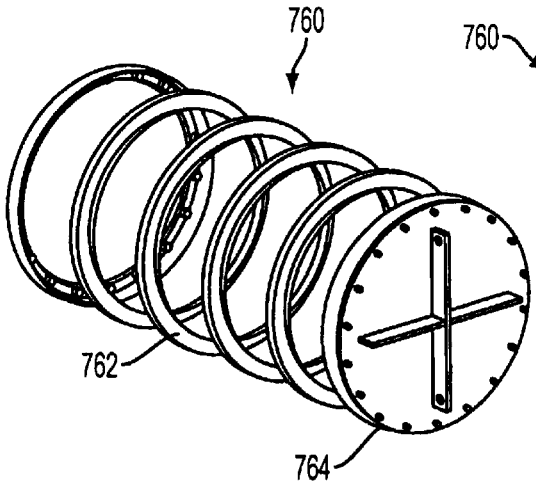
FIGS. 8A and 8B are isometric views of a target configuration.
Figure 8B:
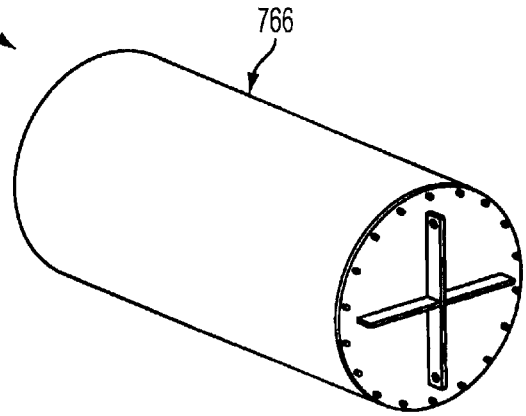

FIGS. 8A and 8B provide isometric diagrams of the target 760 respectively without and with the shell. The target 760 includes a frame of rings 762 and closed at the ends by caps 764. A skin cover 766 sheaths the frame and contains the simulated payload components of the target 760. The targets are surrogates of a section of generic 15-inch-diameter missiles. Outer skin is 2.3 mm thick 2024-T3 aluminum. Circuit boards and other "medium-hardness" materials may be disposed inside of the cover to mimic mass and impact response characteristics of the generic missiles.

Figure 9A:
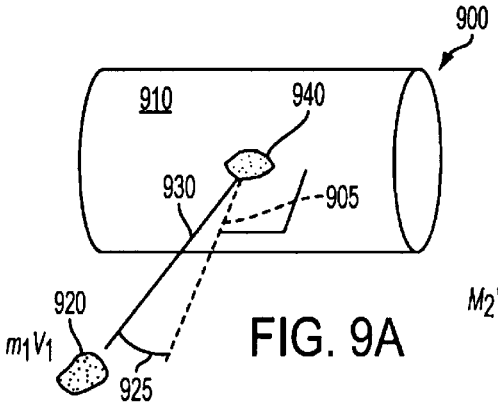
FIGS. 9A and 9B are isometric views of obliquity approach of the projectile to the target.
Figure 9B:
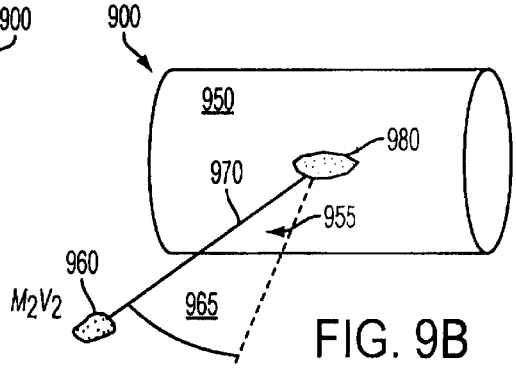

FIGS. 9A and 9B provide a representative diagram 900 showing the target and the approach angle of the projectile. In the example shown in FIG. 9A, a target 910 has an intersection 915 perpendicular to its longitudinal axis of symmetry. A projectile 920 approaches the target 910 on a collision course angularly offset 925 from the perpendicular line 915. The offset is shown to be 15°. The projectile 920 has an inertia defined by $m_1V_1$ along an intercept direction 930. Upon contact with the target 910, the projectile 920 produces an opening 940.

Similarly in FIG. 9B, a target 950 with its intersection 955 is approached by a projectile 960 on a collision course 965 angularly offset 965 from the intersection 955 by 45°. The projectile 920 has an inertia defined by $m_2V_2$ along an intercept direction 970. Upon contact with the target 950, the projectile 960 produces an opening 980. Tests were conducted with angular offsets of alternately 15° and 45°.

For these tests, fragment speed was between about 1.8 and 2.0 km/s. Tests results show that impact obliquity produces greater stress concentration for the elliptical opening at 45° angle than the near-round opening at 15° angle. Spherical fragments are measured in grains, in which 100 grains ≈6.5 grams. The spherical fragments had masses of 150 grains and 300 grains. The number of fragments ranged from 1 through 8 and the fragments were arranged as one row and two rows.

Figure 10:
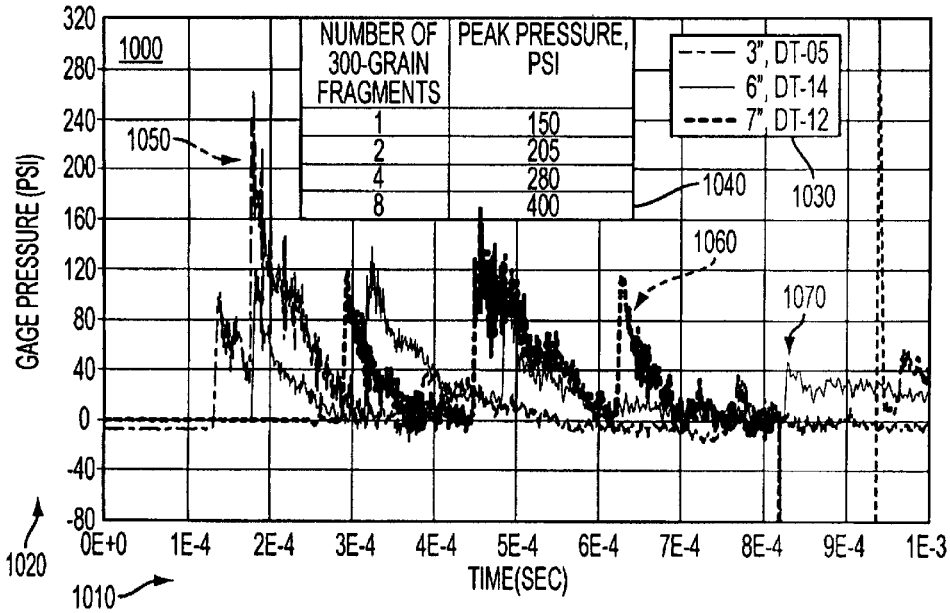
FIG. 10 is a graph of gage pressure versus time.

FIG. 10 provides a graph 1000 of gage pressure versus time from the experimental data. The abscissa 1010 represents elapsed time with grid lines spaced 0.1 milli-second (ms) apart, while the ordinate 1020 represents the instantaneous measured pressure (in psi). A legend 1030 identifies the recorded conditions, and a table 1040 correlates number of fragments with peak pressure. The recorded lines include 1050 for 3-inches—DT-05, 1060 for 6-inches—DT-14, and 1070 for 7-inches—DT-12. The maximum occurs for line 1050 at 0.18 ms with a peak at about 260 psi.

Figure 11:
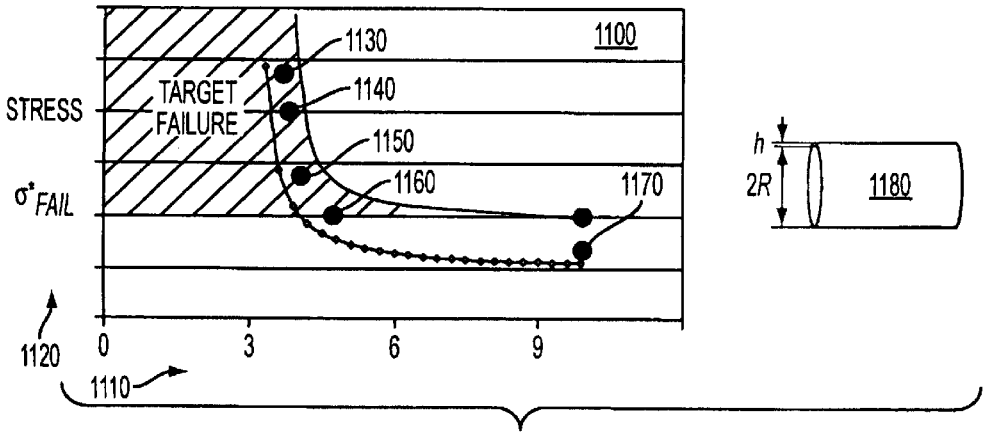
FIG. 11 is a graph of stress versus target thickness.

FIG. 11 provides a graph 1100 showing stress versus an inverse effectiveness measure. The abscissa 1110 represents failure stress of a thin-wall cylindrical target, while the ordinate 1120 represents an inverse of target damage. The graph 1100 shows a target failure region to the left of the upper curve based on evaluated data points for numbers of fragments multiplied by their weight in grains.

These data represent point 1030 for 4×300, 1040 for 8×150, 1050 for 3×300, 1060 for 4×150 as well as 6×300, and 1070 for 2×300. From this information, increasing the probability of target failure correlates with increasing overpressure P, which is achievable by increasing the number and size of penetrators, using more efficient materials and to decrease the distances between perforated openings.

FIG. 12 provides a summary table of experimental test results as described above. The individual tests are distinguished by number of fragments and their size in grains (150 or 300), obliquity angle (15° or 45°), perforation result (all positive), rivet rupture (some positive), torn outer skin and qualitative comments on damage severity to target.

Cracking between closely positioned holes appears to be due to direct impact or after release of a moderate amount of pressurized gas. "Petal" opening or complete skin stripping after releasing large amount of pressurized gas. From the tests, cracking occurred between closely located larger holes. Small cracks or no cracks occurred between the holes located at a larger distance from each other. The target contained a surrogate structure inside and was perforated by fragments, line cracking, small crack and indentation from small fragments.

Six 150-grain fragments having impact speed of 1.8–2.0 km/s with fairly large spacing, caused minor damage. Minor damage was produced after impact by four 150-grain fragments with large spacing in a single-row array and impact speed of 1.8–2.0 km/s. Catastrophic damage after impact was produced by eight 150-grain fragments with large spacing in a two-row array and impact peed of 1.8-2.0 km/s. Partial skin pealing after impact by three 300-grain fragments with impact speed of 1.9–2.0 km/s. Catastrophic failure of the target with the skin blown fifty yards away resulted from impact by four 300-grain fragments at impact speed of 1.9–2.0 km/s. Maximum damage to the target was achieved using four 300-grain fragments at 45° obliquity and eight 150-grain fragments at 15° obliquity. The skin was completely stripped off in these cases.

Small spacing between penetators and increased penetrator size are important for inducing crack propagation between perforated openings. Angles of obliquity 15° and 45° do not seem to influence the damage level. This can be explained by the contribution from the two opposite trends: at 15° impact fragments tend to transfer less impulse to the target skin and probably deliver a smaller amount of penetrator material inside of the target's shell. However the perforated opening is a longer ellipse with a higher stress concentration as compared to rounder openings seen from the 45° impacts.

To correlate the fragments with the openings, analogous length parameters can be determined. A characteristic length dimension of a typical fragment (e.g., a mean diameter within a distribution of fragments) can be compared to the length of the punctured openings in the target's shell. An average distance between fragments can be assumed to correspond to the distance between opening centers. Photographs of openings in the shell at collision velocity (i.e., relative difference between fragments and target) of ~1.9 km/s show a typical opening length of a ~1 inch ~2.5 cm and array distances of b~2 inches ~5 cm where cracks connected the openings, and b~3.5 to 4 inches (9 to 10 cm) without cracks connecting the openings. Empirically, this indicates a ratio of opening to distance lengths of b/a ~2 for producing cracks, but that for b/a<3.6, cracks connecting the openings may be absent.

Fragment dimensions can be analyzed with respect to the masses of fragments tested. Fragments of 150 grains and 300 grains were used. These correspond to ~9.75 grams and ~19.5 grams, respectively. Aluminum has a material density of 291 $kg/m^3$=0.291 $g/cm^3$. A sphere has a volume defined by $v=4\pi r^3/3=m/p$, where r is fragment radius, m is fragment mass and ρ is material density. Thus, $r=[3m/4\pi\rho]^{1/3}=2$ cm for this example.

The relationship between fragment radius and opening length can be characterized as a ratio of r/a=0.8, and cracks appear to be preferably propagated (when b~5 cm) as a ratio r/b~0.4, in which crack length is assumed to be substantially synonymous with the separation distance (i.e., spacing) between fragments. The previously obtained correlation $b \leqq 1.5a$ can also be supplemented as by dividing the relations between opening and fragment as $\{b/a \div r/a\}_{stress} \leqq 1.5/0.8 \sim 1.9$ for the stress calculations. This is confirmed by the absence of cracks in photographs with larger spacing between fragments in which the ratio as $\{b/a \div r/a\}_{nocrack} = b/r < 3.6/0.8 \sim 4.4$. However, empirical data suggest that cracks between openings form at $\{b/r\}_{crack} = (r/b)^{-1} \sim 2.5$, placing a less restrictive limit on this relation. These propagating cracks can facilitate the unfurling of the target's shell, substantially defeating the target's effectiveness in reaching its destination to deliver its contents.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for damaging a target, comprising:

dispersing a plurality of pressure-releasing fragments in an array that is directed to intercept the target; and engaging said fragments to collide against an outer shell of the target, wherein said array distributes said fragments as having a ratio between a characteristic length of said fragments and a separation distance of at most 2.5 and a collision velocity of between 1.8 km/s and 2.0 km/s, and said array is aligned to intercept the target at an angle offset by between 15° and 45° from perpendicular to a longitudinal axis of the target.

2. The method according to claim 1, wherein said ratio is at most 1.9.

3. The method according to claim 1, wherein said characteristic length corresponds to a spherical radius of said fragment.

4. The method according to claim 1, wherein said plurality of fragments is between four and eight, inclusive.

5. The method according to claim 1, wherein each fragment has a mass of between 150 grains and 300 grains.

6. The method to claim 1, wherein each fragment has a shape of one of a prism, a trapezoid and a pyramid.

7. A device for delivering pressure-releasing fragments in a warhead for damaging a target, comprising:

a plurality of submunition fragments in an array that is directed to intercept the target; and a dispersal mechanism for releasing said fragments to collide against an outer sheath of the target, wherein said array distributes said fragments as having a ratio between a characteristic length of said fragments and a separation distance of at most 2.5 and a collision velocity of between 1.8 km/s and 2.0 km/s, and said array is aligned to intercept the target at an angle offset by between 15° and 45° from perpendicular to a longitudinal axis of the target.

8. The device according to claim 7, wherein said ratio is at most 1.9.

9. The device according to claim 7, wherein said characteristic length corresponds to a spherical radius of said fragment.

10. The device according to claim 7, wherein said plurality of fragments is between four and eight, inclusive.

11. The device according to claim 7, wherein each fragment has a mass of between 150 grains and 300 grains.

12. The device according to claim 7, wherein each fragment has a shape of one of a prism, a trapezoid and a pyramid.

* * * * *